(12) United States Patent
Glogauer (10) Patent No.: US 12,474,273 B2
(45) Date of Patent: Nov. 18, 2025

(54) KIT AND METHOD FOR MONITORING ORAL INFLAMMATION ASSOCIATED WITH PERIODONTAL DISEASES

(71) Applicant: ORAL SCIENCE INTERNATIONAL INC., Brossard (CA)

(72) Inventor: Michael Glogauer, Brossard (CA)

(73) Assignee: ORAL SCIENCE INTERNATIONAL INC., Brossard (CA)

( * ) Notice: Subject to any disclaimer, the term of this patent is extended or adjusted under 35 U.S.C. 154(b) by 557 days.

(21) Appl. No.: 17/997,397

(22) PCT Filed: Apr. 30, 2021

(86) PCT No.: PCT/CA2021/050604
§ 371 (c)(1),
(2) Date: Oct. 28, 2022

(87) PCT Pub. No.: WO2021/217272
PCT Pub. Date: Nov. 4, 2021

(65) Prior Publication Data
US 2023/0175971 A1    Jun. 8, 2023

Related U.S. Application Data

(60) Provisional application No. 63/017,753, filed on Apr. 30, 2020.

(51) Int. Cl.
*G01N 21/78* (2006.01)
*G01N 21/29* (2006.01)
*G01N 33/569* (2006.01)

(52) U.S. Cl.
CPC ......... *G01N 21/78* (2013.01); *G01N 21/293* (2013.01); *G01N 33/56955* (2013.01); *G01N 2800/7095* (2013.01)

(58) Field of Classification Search
CPC ............... G01N 21/78; G01N 21/293; G01N 33/56955; G01N 2800/7095;
(Continued)

(56) References Cited

U.S. PATENT DOCUMENTS

| 4,278,763 A | 7/1981 | Berger et al. |
| 5,051,358 A | 9/1991 | Witt |

(Continued)

FOREIGN PATENT DOCUMENTS

| CA | 2562655 A1 | 4/2008 |
| WO | 2009152513 A1 | 12/2009 |

(Continued)

OTHER PUBLICATIONS

Mojdami et al. "Minimally Invasive Diagnostic Tools in the Diagnosis of Periodontal Disease" Oral Health (2017).

(Continued)

*Primary Examiner* — Dennis White
(74) *Attorney, Agent, or Firm* — NORTON ROSE FULBRIGHT CANADA LLP (57) ABSTRACT

A kit for detecting an inflammation level of an oral cavity based on a biomarker indicative of inflammation, the kit comprising at least one rinsing substance; a cup sized to contain a predetermined amount of at least one rinsing substance; a colourimetric reference corresponding to a predetermined inflammation level, and a colourimetric indicator reactive to the biomarker in the at least one rinsing substance consistently with the colourimetric reference.

19 Claims, 2 Drawing Sheets

(58) Field of Classification Search
CPC ....... G01N 33/54387; G01N 33/56972; G01N 33/583; G01N 2021/7759; G01N 2201/0221

See application file for complete search history.

(56) References Cited

U.S. PATENT DOCUMENTS

| | | | | |
|---|---|---|---|---|
| 5,866,432 | A * | 2/1999 | Sorsa | G01N 33/573 |
| | | | | 435/7.1 |
| 6,165,416 | A * | 12/2000 | Chandler | G01N 33/525 |
| | | | | 436/178 |
| 6,541,269 | B1 | 4/2003 | Ramana et al. | |
| 7,521,200 | B2 | 4/2009 | Glogauer | |
| 2008/0085533 | A1 | 4/2008 | Glogauer | |
| 2015/0045245 | A1* | 2/2015 | Vanpoucke | G01N 33/6893 |
| | | | | 435/6.12 |
| 2015/0254845 | A1 | 9/2015 | Tsai et al. | |
| 2017/0304164 | A1 | 10/2017 | Green | |

FOREIGN PATENT DOCUMENTS

| | | |
|---|---|---|
| WO | 2010090810 A2 | 8/2010 |
| WO | 2014118090 A1 | 8/2014 |
| WO | 2019/197451 A1 | 10/2019 |

OTHER PUBLICATIONS

Skjold, AC, et al., New dip-and-read test for determining leukocytes in urine, Clin Chem. 33: 1242-45 (1987).

Nelson, DA, in Henry, JB, editor, Clinical Diagnosis and Management by Laboratory Methods, vol. I (16th edition), W B Saunders Company, Philadelphia, PA, Chapter 27, (1997).

Zahra Dorna Mojdami et al., Minimally Invasive Diagnostic Tools in the Diagnosis of Periodontal Disease, [online], Nov. 1, 2018, oral health, https://www.oralhealthgroup.com/features/minimally-invasive-diagnostic-toolsdiagnosis-periodontal-disease/.

Tröger et al. "Detection of saliva traces using test strips", Forensic Sci Int., Jun. 1984 vol. 25, No. 2, 143-6, doi: 10.1016/0379-0738(84)90023-9.

* cited by examiner

KIT AND METHOD FOR MONITORING ORAL INFLAMMATION ASSOCIATED WITH PERIODONTAL DISEASES

CROSS-REFERENCE TO RELATED APPLICATION

The present application claims the priority of U.S. patent application No. 63/017,753, filed on Apr. 30, 2020, and incorporated herein by reference.

FIELD OF THE TECHNOLOGY

The present technology relates to a non-invasive diagnostic test for monitoring oral inflammation associated with periodontal diseases in human patients.

BACKGROUND OF THE TECHNOLOGY

Screening for periodontal diseases has heretofore required regular visits to the dentist in order for a regular examination to be carried out. Periodontal diseases are inflammatory conditions that result in loss of the bone, gingiva (gums) and ligament that support the teeth. The destruction of the tooth supporting tissues (periodontium) may occur as a result of collateral damage caused by enzymes released by specialized white blood cells called neutrophils as they attempt to contain the bacterial infection. Periodontal diseases are one of the most prevalent diseases occurring in humans.

Typically, diagnosis of the severity of periodontal diseases is determined by periodic professional dental examination of the amount of lost bone, ligament and gingival tissues. This examination requires the insertion of a thin metal probe under the gum tissues surrounding the teeth. The depth to which to probe extends is noted indicating the degree of "detachment" and loss of the supporting tissues around the teeth. A key measure is the degree of bleeding that occurs following probe insertion which indicates the degree of inflammation, which may suggest ongoing disease activity. This bleeding provides a crude quantitative measure of ongoing disease activity. Some studies have shown that the degree of bleeding is an accurate predictor of future periodontal tissue loss around a given tooth. This bleeding measure depends on the probing force used by the clinician and therefore is not comparable from appointment to appointment nor clinician to clinician for a given patient.

There are also biochemical tests that have been developed to identify enzymes that are released by cells of the periodontium and the immune system into the oral cavity. However these tests require specialized equipment and training to carry out.

Since periodontal diseases usually do not cause pain, patients will often not be aware that there is any active disease occurring in their mouths. Some may notice occasional bleeding when they brush their teeth but some may choose to ignore this as the bleeding is often transient in nature. Some studies have correlated the presence of neutrophils entering into the mouth through the gingival crevice surrounding the teeth in the crevicular fluid as a possible measure of oral inflammation. Moreover, oral fluids may carry cells that may be indicative of other conditions. Currently, microscopes are sold to dentists to enable them to visually count or quantify neutrophils taken from samples around teeth.

SUMMARY OF THE TECHNOLOGY

In a first aspect of the present technology, there is provided a method for detecting an inflammation level of an oral cavity based on a biomarker indicative of inflammation, the method comprising: collecting from the oral cavity a rinsing substance from a rinse of the oral cavity with a predetermined amount of the rinsing substance; exposing a colourimetric indicator to the rinsing substance, the colourimetric indicator reactive to the biomarker, and after allowing a reaction of the colourimetric indicator to the rinsing substance, comparing a colour of the colourimetric indicator to a colourimetric reference to detect the inflammation level of the oral cavity.

Further in accordance with the first aspect, for instance, performing the rinse of the oral cavity with the predetermined amount of the rinsing substance may occur prior to the collecting.

Still further in accordance with the first aspect, for instance, performing a pre-rinse of the oral cavity may occur prior to performing the rinse.

Still further in accordance with the first aspect, for instance, performing the pre-rinse includes performing the pre-rinse with water.

Still further in accordance with the first aspect, for instance, performing the pre-rinse with water includes performing the pre-rinse with sterile and/or distilled water.

Still further in accordance with the first aspect, for instance, determining the predetermined amount of the rinsing substance based on at least one user variable may occur prior to performing the rinse.

Still further in accordance with the first aspect, for instance, determining the predetermined amount of the rinsing substance based on the at least one user variable includes using one or more of weight, age, sex, height, oral cavity volume as the at least one user variable.

Still further in accordance with the first aspect, for instance, determining a duration of the rinse may occur prior to performing the rinse.

Still further in accordance with the first aspect, for instance, determining the duration of the rinse is based on at least one user variable including one or more of weight, age, sex, height, oral cavity volume as the at least one user variable.

Still further in accordance with the first aspect, for instance, performing the rinse includes performing the rinse with water, the water meeting a predetermined quality standard.

Still further in accordance with the first aspect, for instance, performing the rinse with water includes performing the rinse with sterile and/or distilled water.

Still further in accordance with the first aspect, for instance, performing the rinse includes using a cup, and collecting the rinsing substance includes using said cup.

Still further in accordance with the first aspect, for instance, exposing the colourimetric indicator to the rinsing substance includes using a test strip.

Still further in accordance with the first aspect, for instance, using the test strip includes immersing at least a portion of the test strip in the rinsing substance.

Still further in accordance with the first aspect, for instance, a value associated with the inflammation level may be obtained from the comparing.

Still further in accordance with the first aspect, for instance, a dose of an antibiotic substance to be taken orally may be determined as a function of the value.

Still further in accordance with the first aspect, for instance, a necessity of a therapeutic rinse may be determined as a function of the value.

Still further in accordance with the first aspect, for instance, recording and/or imaging the colour and/or the value associated with the inflammation level may be done in a processing unit.

Still further in accordance with the first aspect, for instance, the method may be iterable so as to detect an inflammation level variation.

Still further in accordance with the first aspect, for instance, exposing a colourimetric indicator to the rinsing substance includes exposing the colourimetric indicator to neutrophils in the rinsing substance, the colourimetric indicator reactive to the neutrophils.

In accordance with a second aspect of the present disclosure, there is provided a kit for detecting an inflammation level of an oral cavity based on a biomarker indicative of inflammation, the kit comprising: a colourimetric reference corresponding to a predetermined inflammation level, and a colourimetric indicator reactive to the biomarker in a rinsing substance consistently with the colourimetric reference.

Further in accordance with the second aspect, for instance, a volume of the rinsing substance may be included.

Still further in accordance with the second aspect, for instance, the rinsing substance is water, the water meeting a predetermined quality standard.

Still further in accordance with the second aspect, for instance, the water is sterile and/or distilled water.

Still further in accordance with the second aspect, for instance, the rinsing substance is in a predetermined amount based on at least one user variable including one or more of weight, age, sex, height, oral cavity volume.

Still further in accordance with the second aspect, for instance, instructions may be included to determine an amount of the rinsing substance to be used, and a duration of the rinse.

Still further in accordance with the second aspect, for instance, the instructions may include taking into consideration at least one user variable including one or more of weight, age, sex, height, oral cavity volume.

Still further in accordance with the second aspect, for instance, a volume of a pre-rinse substance may be included.

Still further in accordance with the second aspect, for instance, the pre-rinse substance is water.

Still further in accordance with the second aspect, for instance, the water for pre-rinse is sterile and/or distilled water.

Still further in accordance with the second aspect, for instance, the pre-rinse substance is in a predetermined amount based on at least one user variable including one or more of weight, age, sex, height, oral cavity volume.

Still further in accordance with the second aspect, for instance, instructions may be included to determine an amount of the pre-rinse substance to be used, and a duration of the pre-rinse.

Still further in accordance with the second aspect, for instance, the instructions may include taking into consideration at least one user variable including one or more of weight, age, sex, height, oral cavity volume.

Still further in accordance with the second aspect, for instance, the rinsing substance and the pre-rinse substance are the same.

Still further in accordance with the second aspect, for instance, a cup may be present and configured to the rinsing substance.

Still further in accordance with the second aspect, for instance, the cup is a graduated cup.

Still further in accordance with the second aspect, for instance, the cup is a sterilized cup.

Still further in accordance with the second aspect, for instance, the colourimetric indicator is part of a test strip.

Still further in accordance with the second aspect, for instance, the test strip has an absorbent pad with the colourimetric indicator.

Still further in accordance with the second aspect, for instance, a plurality of the test strip are present.

Still further in accordance with the second aspect, for instance, the colourimetric reference is a colourimetric chart.

Still further in accordance with the second aspect, for instance, the colourmetric has a plurality of values respectively corresponding to one of a plurality of predetermined inflammation levels.

Still further in accordance with the second aspect, for instance, the colourimetric indicator is a neutrophil-reactive indicator.

In accordance with a third aspect of the present disclosure, there is provided a system for detecting an inflammation level of an oral cavity of a user based on a biomarker indicative of inflammation, comprising: a processing unit; and a non-transitory computer-readable memory communicatively coupled to the processing unit and comprising computer-readable program instructions executable by the processing unit for: obtaining an image of a colourimetric indicator exposed to a rinsing substance after a rinse by the user, the colourimetric indicator reactive to a known biomarker, and comparing a colour of the colourimetric indicator to a colourimetric reference to detect the inflammation level of the oral cavity; and outputting the inflammation level of the oral cavity.

Further in accordance with the third aspect, for instance, the computer-readable program instructions are executable by the processing unit for including determining an amount of the rinsing substance based on at least one user variable prior to the user performing the rinse.

Still further in accordance with the third aspect, for instance, the computer-readable program instructions are executable by the processing unit for determining the amount of the rinsing substance based on the at least one user variable being one or more of weight, age, sex, height, oral cavity volume.

Still further in accordance with the third aspect, for instance, the computer-readable program instructions are executable by the processing unit for determining a duration of the rinse, prior to performing the rinse.

Still further in accordance with the third aspect, for instance, the computer-readable program instructions are executable by the processing unit for determining the duration of the rinse based on the at least one user variable being one or more of weight, age, sex, height, oral cavity volume.

Still further in accordance with the third aspect, for instance, the computer-readable program instructions are executable by the processing unit for determining a dose of an antibiotic substance to be taken orally as a function of the inflammation level of the oral cavity.

Still further in accordance with the third aspect, for instance, the computer-readable program instructions are executable by the processing unit for determining a necessity of a therapeutic rinse as a function of the inflammation level.

Still further in accordance with the third aspect, for instance, the computer-readable program instructions are executable by the processing unit for recording the colour and/or the inflammation level in a user file.

Still further in accordance with the third aspect, for instance, the computer-readable program instructions are executable by the processing unit in an iterative manner so as to detect an inflammation level variation.

BRIEF DESCRIPTION OF THE DRAWINGS

Reference may now be had to the following detailed description, taken together with the accompanying drawings in which.

DETAILED DESCRIPTION OF THE TECHNOLOGY

Figure 1:
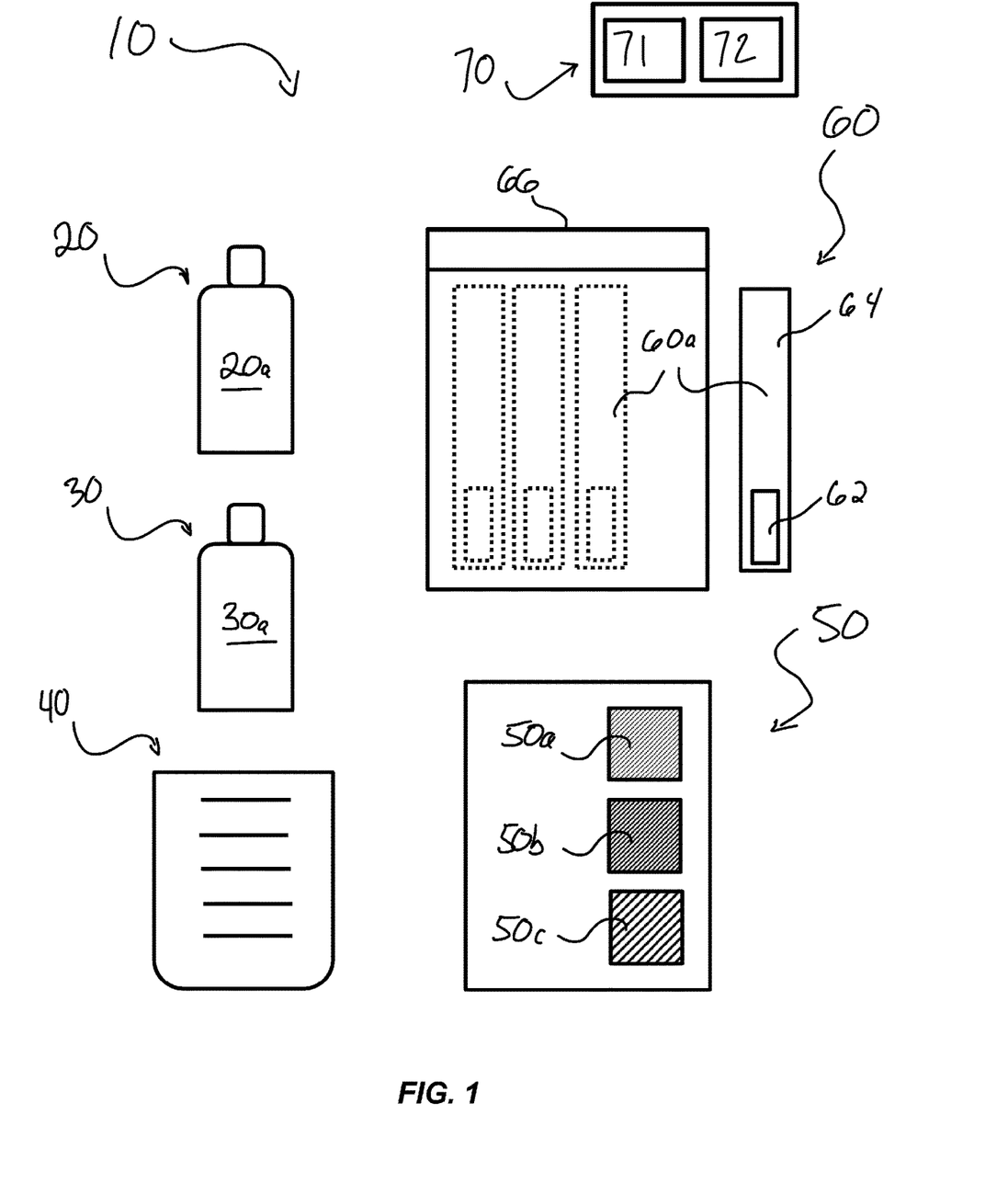
FIG. 1 is an embodiment of a kit for detecting inflammation level of an oral cavity according to an aspect of the present technology.

In one aspect of the present technology, there is provided a kit 10 for detecting an inflammation level in an oral cavity of a given subject. Detection of a biomarker indicative of inflammation in the oral cavity by means of the kit 10 may correlate to existence and/or severity of a periodontal disease, and consequently signal a need for seeking out dental care. Hence, the kit 10 may be provided for use in the absence of professional clinical supervision, i.e., intended to be self-administered by an end user. The kit 10 may also be used by clinicians (e.g., dentists, orthodontists, physicians, pharmacists) and by associated personnel, such as nurses, dental hygienist, etc. Use of the kit 10 may thus be clinically used or prescribed on a preventive basis or for the monitoring of the evolution of a pre-existing case of periodontal disease.

With reference to FIG. 1, the kit 10 generally includes a first rinsing substance 20, a second rinsing substance 30, a receptacle such as a cup 40, a colourimetric reference 50 and/or a colourimetric indicator 60 (note: colourimetric could also be spelled colorimetric). The kit 10 may include fewer or more items. The first and second rinsing substances 20, 30 may for example be water-based substances provided in predetermined amounts. In embodiments, the first and second rinsing substances 20, 30 are both pure and/or sterile water packaged in dose containers 20a, 30a of the predetermined amounts, in an example single-dose containers of about 10 mL each. Alternatively, the first and second rinsing substances 20, 30 may come in a bulk container having multiple doses. The first and second rinsing substances 20, 30 may be the same and may come in a single multi-dose container, such as a bottle. Either or both of the first and second rinsing substances 20, 30 may be water meeting a predetermined industrial or regulatory quality standard, for example a USP® standard. In some embodiments, the first rinsing substance 20 may instead be distilled water or tap water. In some embodiments, either of the first and second rinsing substances 20, 30 may be omitted from the kit 10 and may be provided otherwise. The volume of first and/or second rinsing substances 20 (if present), 30, may be selected as a function of the user's mouth cavity size. For example, the volume may be based on the age (e.g., child, adult), the gender, the user height, or oral cavity volume, obtained for example through volumetric measurements.

The cup 40 is an example of a liquid receptacle that may be used in the kit 10, though a user may use a personal cup as well. If the cup 40 is provided as part of the kit 10, it is sized for containing at least the predetermined amount of the second rinsing substance 30. For example, the cup 40 may have a capacity equal to or exceeding the predetermined amount, for example 50 mL. The cup 40 may be transparent and/or be adorned with graduation marks so as to allow dosing the predetermined amounts of either of the first and second rinsing substances 20, 30, as the case may be. The cup 40 may have a construction rendering it sterilizable, and/or may be provided sterile. In an embodiment, the cup 40 may be a single use cup, and may come in a wrapper preserving its sterile condition.

The reference 50 is an article exhibiting a reference colour 50a that relates to a predetermined level of inflammation. The colourimetric reference 50 may be a card or the like, or an electronic device capable of displaying the reference colour 50a with an adequate degree of accuracy. The predetermined level of inflammation associated with the reference colour 50a may for instance correspond to a clinical relevance threshold for determining the onset of a periodontal pathology. The colourimetric reference 50 may also exhibit additional colours 50b, 50c. The colours 50a, 50b, 50c, . . . 50n differ from one another at least in intensity and respectively correspond to a different predetermined level of inflammation.

The indicator 60 is an article which carries a reagent specific to the biomarker, i.e., a substance reactive to the biomarker so as to produce a visually discernible colour change. The reagent may be specific to a certain type of biomarker such as a neutrophil, and may generally correspond to of one of the substances disclosed in Canadian Patent No. 2 562 655, incorporated herein by reference. The reference 50 and the indicator 60 are arranged such that, under certain circumstances, the indicator 60 may undergo a colour change in presence of a predetermined concentration of the biomarker so as to exhibit the reference colour 50a, 50b, 50n. In an embodiment, the indicator 60 is in a powder form, or in a liquid form, to be mixed with a collected solution. The amount of powder/liquid indicator 60 to be used may be as a function of the volume of the collected sample.

In some embodiments, the indicator 60 includes a pad 62 attached to a carrier 64 so as to form a test strip 60a. The pad 62 may have a construction different than that of the carrier 64, and may for example be constructed of an absorbent material. The pad 62 may carry the reagent, and may be arranged to form a means for sampling a predetermined amount of a solution (such as the second rinsing substance 30 containing the biomarker) so as to impregnate the reagent. The reagent may be dispersed and provided in a quantity sufficient in the pad 62 to react to the biomarker present in the predetermined amount of the solution. The indicator 60 may also be arranged for reacting to any one of a plurality of predetermined concentrations of the biomarker, resulting in the indicator 60 exhibiting a corresponding one of a plurality of colours, for example the colours 50a, 50b, 50c, 50n of the reference 50. In an embodiment, the indicator 60 is a test strip without the pad 62, the test strip including the reagent having the capacity of reacting when exposed to the biomarker in the rinsing substance.

Further, in some embodiments, the kit 10 may also include additional indicators 60 and a container 66 provided to store such indicators 60 in a generally inert environment. In some such embodiments, the reference 50 may be affixed to the container 66. Hence, the kit 10 may be a multi-test kit, having the necessary components for multiple diagnostic tests to be performed, for instance for different patients/users and/or over a prolonged period. The kit 10 may also include instructions in using the kit 10. For example, the instructions may be in the form of a pamphlet, an application, a website, a barcode or QR code leading to a website or to an instruction manual, that guides the user through the use of the kit 10. The instructions may for instance follow the guidelines set out in the method 100 detailed below.

Other components may be part of the kit 10. One or more tubes of a periodontal toothpaste and/or oral care tooth brush(es), and/or oral care rinse with therapeutic agent to reduce the inflammation may be present. In an embodiment, the oral care rinse is to be used in the event that an inflammation is detected, using the colourimetric indicator 60. In an embodiment, antibiotics may also be provided, with strict instructions on dosage to be given to the user of the kit 10, such as indications for the antibiotics to be used only in the event that an inflammation is detected, using the colourimetric indicator 60, for example upon using the method 100. The kit 100 may also be used with a system 70 that is an application for a mobile device, that is part of a web-based platform. The system 70 is of the type that has a processing unit 71 and non-transitory computer-readable memory 72 communicatively coupled to the processing unit 71, with computer-readable program instructions executable by the processing unit 71 for performing various functions. Some of the functions that may be performed by the system 70, in support to a user(s) of the kit 10, may include obtaining an image of a colourimetric indicator exposed to a rinsing substance after a rinse by the user, the colourimetric indicator reactive to a known biomarker; comparing a colour of the colourimetric indicator to a colourimetric reference to detect the inflammation level of the oral cavity; outputting the inflammation level of the oral cavity. Other functions of the system 70 may include determining an amount of the rinsing substance based on at least one user variable prior to the user performing the rinse; determining the amount of the rinsing substance based on the at least one user variable being one or more of weight, age, sex, height, oral cavity volume; determining a duration of the rinse, prior to performing the rinse; determining the duration of the rinse based on the at least one user variable being one or more of weight, age, sex, height, oral cavity volume; determining a dose of an antibiotic substance to be taken orally as a function of the inflammation level of the oral cavity; determining a necessity of a therapeutic rinse as a function of the inflammation level; recording the colour and/or the inflammation level in a user file. This may be done by the system 70 in an iterative manner so as to detect an inflammation level variation.

Figure 2:
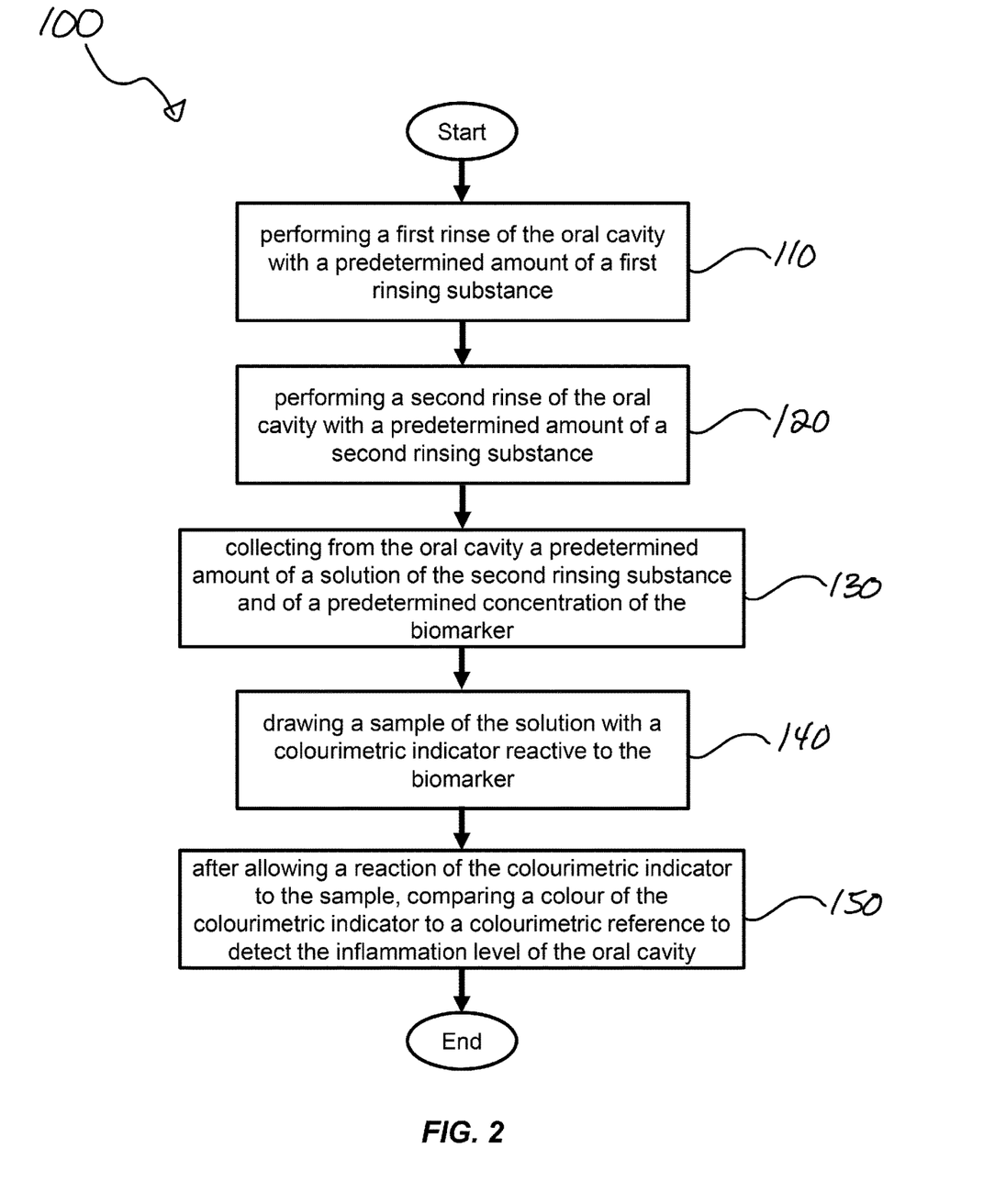
FIG. 2 is a flow chart of steps of an embodiment of a method for detecting an inflammation level of an oral cavity according to another aspect of the present technology.

In another aspect of the present technology, there is provided a method 100 for detecting the level of inflammation in the oral cavity. The method 100 may, in some embodiments, involve using the kit 10 described hereinabove, or other kits, devices or components. In some such embodiments, the method 100 may commence with a user obtaining the kit 10.

With reference to FIG. 2, the method 100 includes a step 110 of performing a first rinse of the oral cavity with a predetermined amount of the first rinsing substance 20. According to this step, the user may undertake to flush their mouth (i.e., perform the first rinse) with the first rinse substance 20 to clear debris and biomarkers which may be residually present inside the oral cavity. The first rinse substance 20 may be for example sterile water obtained from the dose container 20a of the kit 10, but may also be tap water, spring water, bottled water or treated water, present or not in the kit 10. In an embodiment, the user may measure the predetermined amount of the first rinsing solution 20 using the cup 40. The first rinse may be carried out for a fixed duration of about, such as 10 to 30 seconds, for example about 15 seconds, to effectively flush debris from the oral cavity. The substance 20 may then be disposed of, after the first rinse. In a variant, the method 100 is done while an application, web-based platform or the like is running in parallel, with the guidance on the steps to follow. For example, the application web-based platform or the like may integrate a clock or timer to indicate the flush duration. The user may press start for a countdown to begin, with an alarm alerting of the end of the flush period with the first rinse.

The method 100 may also include a step 120 of performing a second rinse of the oral cavity with a predetermined amount of the second rinsing substance 30. According to this step, after waiting out a delay following the first rinse, for instance as guided by the application, web-based platform or the like, the user undertakes to rinse their mouth (i.e., perform the second rinse) once again. The delay may be of between about 110 to 130 seconds, for example about 120 seconds. The delay before performing step 120 may be timed by the application, web-based platform or the like, if present. The second rinse substance 30 may for example be sterile water be obtained from the dose container 30a of the kit 10, but may also be tap water, spring water, bottled water or treated water, present or not in the kit 10. The user may otherwise measure the predetermined amount of the second rinsing solution 30 using the cup 40. The user may carry out the second rinse for a fixed duration of between, for example, about 25 to 35 seconds, for example about 30 seconds, to rinse off the biomarkers that may be present in their oral cavity with the second rinsing substance 30 so as to form a solution. The delay for performing step 120 may be timed by the application, web-based platform or the like, if present. As part of the step 120, or before the step 120, a user may have to select an amount of rinsing substance 30 as a function of factors such as a age, gender, height, weight, mouth sizing parameters, among others. The user may then measure the second rinsing substance 30 based on the selected amount. This may also be done with the first rinsing substance 20. In another embodiment, the user is given a sample size based on the factors. In an embodiment, the application, web-based platform or the like, if present, may indicate the volume of rinsing substance after the use enters these factors. The volume of rinsing substance, especially that of rinsing substance 30, may be an important parameter in the determination of the concentration of biomarkers, as proportionality between the oral cavity capacity and the rinsing substance volume may dictate the accuracy of the method 100.

A material amount of the biomarkers present in the solution resulting from the second rinse may have been released in the oral cavity after completion of the first rinse and at a rate corresponding to the inflammation level in the mouth. Hence, a predetermined concentration of the biomarkers in the solution may be said to be a function of the delay following the first rinse, the duration of the second rinse, and/or of the predetermined amount of the second rinsing substance. In step 130, the method 100 provides collecting a predetermined amount of the solution from the oral cavity. The user may collect the predetermined amount, for example about 10 mL, in the cup 40. Other receptacles may be suitable for use instead of the cup 40, provided that they are empty and clean. In an embodiment, the user collects all of the second rinsing substance 30 in the cup 40.

In step 140, the method 100 provides drawing a sample of the solution with the indicator 60 or exposing the indicator 60 to the collected sample of the solution, for example one of the test strips 60a of the kit 10 stored in the container 66. Upon collecting the solution, the user may obtain the test strip 60a. This may for instance be done by temporarily opening the container 66, if present, to retrieve the test strip 60a, closing the container 66 shortly thereafter so as to limit undue exposure of a remainder of the test trips 60a to exterior contaminants. The user may next plunge the test strip 60a into the collected solution so as to instantly immerse a portion of the indicator 60, such as the pad 62, if present. Then, the user may allow a reaction of the test strip 60a to occur for a predetermined duration upon emergence of the indicator 60 from the solution. The predetermined duration may be of between about 50 to 70 seconds, for example about 60 seconds. The delay for performing step 140 may be timed by the application, web-based platform or the like, if present. This duration is merely given as an example. The user may at this point start a timer (e.g., on the application, web-based platform or the like) to ensure that the predetermined duration is properly observed. The user may lay the test strip 60a bare on a flat, clean surface, with the pad 62 facing upward, until the predetermined duration expires.

Next, in step 150, the method 100 provides, after allowing the reaction to occur for the predetermined duration, comparing a colour of the indicator 60 to the reference 50 of the kit 10. The user may thus detect the occurrence of inflammation in their oral cavity upon the colour exhibited by the indicator 60 of the kit 10 matching the reference colour 50a. Instantly upon completion of the predetermined duration, or after a given time lapse, the user may record the colour of the indicator 60, for example by making a note or by taking a photo of the indicator 60 with a camera or other suitable device. In the event that an application, web-based platform or the like is present, the images and/or data may be uploaded to the application. In an embodiment, the comparison is done by a processor. This may entail capturing the image and data associated with the flash (e.g., type, intensity, etc.), for a determination of the colour to be based on the ambient light at image capture. In a variant, the image of the used indicator 60, it may be considered to concurrently take in the image a calibration reference colour known by the application, web-based platform or the like, as a relative reference. The calibration reference colour may be used by the processing unit to decode imaging lighting parameters, and increase an accuracy of the comparison. Recording the colour of the indicator 60 may allow to delay the comparison to the reference 50 or to allow an eventual comparison to another indicator 60. Indeed, the method 100 may be iterable over time to allow the user to detect an inflammation level variation in their oral cavity.

In some embodiments, the method 100 may be carried out clinically. In such embodiments, the first rinse substance 20 may be 10 mL of tap water, the second rinse substance 30 may be 10 mL of sterile water and the cup 40 may be a 50 mL container and the container 66 may be a bottle, as an example among others as the conditions are only provided in an exemplary manner. The method 100 includes providing a patient with the first rinse substance, e.g., in the cup 40, for the patient to carry out an oral pre-rinse (e.g., for 15 seconds), after an oral pre-rinse period (e.g., 2 minutes), providing the patient with the second rinse solution 30, e.g., in the cup 40, for the patient to carry out an oral rinse (e.g., for 30 seconds), collecting a rinse solution resulting from the oral rinse from the patient into the cup 40, obtaining one indicator 60 (for example by opening the container 66 containing indicators 60 provided in the form of test strips 60a, removing one test strip 60a from the bottle and closing the container 66 immediately thereafter), immersing the pad 62 or other part of the indicator 60 into the solution, removing the indicator 60 from the solution immediately upon immersing it, placing the indicator 60 on a flat, clean surface (e.g., with the pad 62 facing up), and, after removing the pad 62 from the solution (e.g., about 1 minute), comparing the colour to the reference 50, or imaging same for analysis by a processor unit of an application, web-based platform, etc. The method 100 may provide recording the colour of the indicator 60 alongside the reference 50, for example using a mobile device such as a smartphone. The application, web-based platform, or the like, may keep an history of the user's indicators 60 or like data entered, to determination a progression/regression of any inflammation. Moreover, in the event that therapeutic agents (e.g., periodontal toothpaste, oral case rinse) and/or antibiotics are used, the progression/regression of the inflammation may be as a function of the administration of therapies/medication, to monitor the effect of the administration on the user.

In an embodiment, the leukocyte levels in the oral cavity could be tied to other clinical conditions. For example, a correlation exists between leukocyte presence in the mouth and bone marrow transplant engraftment. In an embodiment, the kit 10 and/or the method 100 are used to detect leukocyte presence in the mouth, which may be a indicative of bone marrow transplant success.

In an embodiment, the method 100 may be summarized as being for detecting an inflammation level of an oral cavity based on a biomarker indicative of inflammation, and may include one or more of: collecting from the oral cavity a rinsing substance from a rinse of the oral cavity with a predetermined amount of the rinsing substance; exposing a colourimetric indicator to the rinsing substance, the colourimetric indicator reactive to the biomarker, after allowing a reaction of the colourimetric indicator to the rinsing substance, comparing a colour of the colourimetric indicator to a colourimetric reference to detect the inflammation level of the oral cavity.

The above description is meant to be exemplary only, and one skilled in the art will recognize that changes may be made to the embodiments described without departing from the scope of the technology disclosed. Still other modifications which fall within the scope of the present technology will be apparent to those skilled in the art, in light of a review of this disclosure, and such modifications are intended to fall within the appended claims.

The invention claimed is:

1. A method for detecting an inflammation level of an oral cavity of a user based on a biomarker indicative of inflammation present in the oral cavity of the user, the method comprising:
   pre-rinsing the oral cavity including introducing an oral pre-rinse substance in the oral cavity, then disposing of the pre-rinse substance from the oral cavity;
   introducing, after delaying for a given period after disposing of the pre-rinse substance from the oral cavity, a predetermined amount of a rinsing substance in the oral cavity, wherein delaying for the given period consists of delaying for between about 110 to about 130 seconds;
   the oral cavity with the predetermined amount of the rinsing substance inside the oral cavity;
   collecting the biomarker released in the rinsing substance by retrieving a sample volume of the rinsing substance in a container;
   absorbing, into a colourimetric indicator, an amount of the biomarker by immersing a carrier in the sample volume, wherein the colourimetric indicator is located on the carrier and is reactive to the biomarker, and wherein immersing the carrier exposes the colourimetric indicator to the biomarker;

removing the carrier from the container a given time period after immersion thereby allowing a reaction of the colourimetric indicator to the biomarker for a predetermined duration; and identifying a level of inflammation of the oral cavity by comparing a colour of the colourimetric indicator to a colourimetric reference corresponding to a predetermined inflammation level of the oral cavity.

2. The method of claim 1, wherein the immersing of the carrier into the collected rinsing substance includes immersing a test strip having the colourimetric indicator located thereon.

3. The method of claim 1, further comprising rinsing the oral cavity with the rinsing substance for a fixed duration of about 25 to 35 seconds.

4. The method of claim 1, wherein the comparing of the colour of the colourimetric indicator after the predetermined duration includes comparing the colour of the colourimetric indicator after between about 50 to 70 seconds.

5. The method of claim 1, further comprising starting a timer to time the predetermined duration.

6. The method of claim 1, wherein the retrieving the sample volume of the rinsing substance in the container includes collecting an amount of about 10 ml of the rinsing substance from the rinsing of the oral cavity in the container.

7. A method for detection of a biomarker indicative of an inflammation in a user's oral cavity, the method comprising pre-rinsing the oral cavity including introducing an oral pre-rinse substance in the oral cavity, then disposing of the pre-rinse substance from the oral cavity;

introducing, after delaying for between about 110 to about 130 seconds after disposing of the pre-rinse substance from the oral cavity, a predetermined amount of a rinsing substance in the oral cavity, the rinsing substance being water of selected quality standard;

rinsing the user's oral cavity for a fixed duration with the predetermined amount of the rinsing substance;

collecting the biomarker released in the rinsing substance from the oral cavity from the rinsing of the user's oral cavity by retrieving a sample volume of the rinsing substance in a receptacle;

immersing a colourimetric indicator located on a test strip into the sample volume to absorb, into the colourimetric indicator, an amount of the biomarker, the colourimetric indicator reactive to the biomarker;

removing the test strip from the sample volume after a given time period after immersing it, thereby allowing a reaction of the colourimetric indicator to the biomarker; and after a predetermined duration following the removing of the colourimetric indicator of the test strip from the sample volume, identifying a level of inflammation of the oral cavity by comparing a colour of the reacted colourimetric indicator of the test strip to a plurality of values of a colourimetric chart to detect an occurrence of inflammation in the user's oral cavity based on a matching of the colour with one of the plurality of values of the colourimetric chart.

8. The method of claim 7, wherein the rinsing of the user's oral cavity for the fixed duration includes rinsing the user's oral cavity for about 25 to 35 seconds.

9. The method of claim 7, wherein the removing of the test strip from the sample volume after the given time period is removing immediately after immersing the test strip in the sample volume.

10. The method of claim 7, wherein the comparing of the colour of the colourimetric indicator after the predetermined duration includes comparing the colour of the colourimetric indicator after between about 50 to 70 seconds.

11. The method of claim 7, wherein the retrieving the sample volume of the rinsing substance in the receptacle includes collecting an amount of about 10 ml of the rinsing substance from the rinsing of the user's oral cavity.

12. The method of claim 7, further comprising starting a timer to time the predetermined duration.

13. The method of claim 7, further comprising determining the predetermined amount of the rinsing substance based on at least one of the user's weight, age, sex, height, and oral cavity volume prior to performing the rinsing.

14. The method of claim 7, further comprising determining the fixed duration of the rinsing based on at least one of the user's weight, age, sex, height, and oral cavity volume prior to performing the rinsing.

15. The method of claim 7, further comprising removing the test strip from a storage container.

16. The method of claim 7, further comprising obtaining a kit including at least the test strip and the rinsing substance.

17. The method of claim 16, wherein obtaining the kit includes obtaining a dose container containing the predetermined amount of the rinsing substance as part of the kit.

18. The method of claim 16, wherein obtaining the kit includes obtaining the colourimetric chart as part of the kit.

19. A method for detection of a biomarker indicative of an inflammation in a user's oral cavity, the method comprising:

pre-rinsing the oral cavity including introducing an oral pre-rinse substance in the oral cavity, then disposing of the pre-rinse substance from the oral cavity;

introducing, after delaying for between about 110 to about 130 seconds after disposing of the pre-rinse substance from the oral cavity, a predetermined amount of a rinsing substance of a dose container in the oral cavity, the rinsing substance being water of selected quality standard;

rinsing the user's oral cavity for about 25 to 35 seconds with the predetermined amount of the rinsing substance;

collecting the biomarker released in the rinsing substance from the oral cavity from the rinsing of the user's oral cavity by retrieving a sample volume of about 10 mL of the rinsing substance from the rinsing of the oral cavity in a receptacle;

immersing a colourimetric indicator located on a test strip into the sample volume to absorb, into the colourimetric indicator, an amount of the biomarker, the colourimetric indicator reactive to the biomarker;

removing the test strip from the sample volume after a given time period after immersing it, thereby allowing a reaction of the colourimetric indicator to the biomarker; and after between about 50 to 70 seconds following the removing of the colourimetric indicator of the test strip from the sample volume, identifying a level of inflammation of the oral cavity by comparing a colour of the reacted colourimetric indicator of the test strip to a plurality of values of a colourimetric chart to detect an occurrence of inflammation in the user's oral cavity based on a matching of the colour with one of the plurality of values of the colourimetric chart.

* * * * *